US011867379B2

(12) United States Patent
Wang et al.

(10) Patent No.: US 11,867,379 B2
(45) Date of Patent: Jan. 9, 2024

(54) LIGHTING APPARATUS

(71) Applicant: BOE TECHNOLOGY GROUP CO., LTD., Beijing (CN)

(72) Inventors: Wenbin Wang, Beijing (CN); Lei Cao, Beijing (CN); Yunpeng Wu, Bejing (CN); Yanjun Chen, Beijing (CN); Sijia Guo, Bejing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/789,923

(22) PCT Filed: Jun. 8, 2021

(86) PCT No.: PCT/CN2021/098913
§ 371 (c)(1),
(2) Date: Jun. 29, 2022

(87) PCT Pub. No.: WO2022/012222
PCT Pub. Date: Jan. 20, 2022

(65) Prior Publication Data

US 2023/0048453 A1 Feb. 16, 2023

(30) Foreign Application Priority Data

Jul. 14, 2020 (CN) ......................... 202010673846.7

(51) Int. Cl.
*F21S 6/00* (2006.01)
*F21V 1/00* (2006.01)
(Continued)

(52) U.S. Cl.
CPC ................ *F21S 6/002* (2013.01); *F21V 1/00* (2013.01); *F21V 23/0485* (2013.01); *F21V 23/06* (2013.01)

(58) Field of Classification Search
CPC ..... F21S 6/002; F21S 9/02; F21S 6/00; F21V 1/00; F21V 23/0485; F21V 23/06;
(Continued)

(56) References Cited

U.S. PATENT DOCUMENTS

| | | | |
|---|---|---|---|
| 2010/0202146 A1 | 8/2010 | Gobindram et al. | |
| 2016/0238235 A1 | 8/2016 | Garrett et al. | |
| 2017/0027361 A1 * | 2/2017 | Santiago | F21V 1/04 |

FOREIGN PATENT DOCUMENTS

| | | |
|---|---|---|
| CN | 201259145 Y | 6/2009 |
| CN | 202002002 U | 10/2011 |

(Continued)

OTHER PUBLICATIONS

CN 108954070, Weibing Ye, Dec. 12, 2018, "Desk Lamp" English Translation (Year: 2018).*

(Continued)

*Primary Examiner* — Peggy A Neils
(74) *Attorney, Agent, or Firm* — Lippes Mathias LLP

(57) ABSTRACT

A lighting apparatus includes: a lamp body assembly, including a support base, a lampshade mounted on the support base, and a light-emitting body, a power supply module and a first connector that are connected to the support base, wherein the light-emitting body is electrically connected to the power supply module; a display assembly, including a carrier, a second connector connected to the carrier and facing the support base, and a display screen connected to the carrier, wherein the display screen is electrically connected to the power supply module; and a support assembly, connected to the first connector and the second connector.

20 Claims, 8 Drawing Sheets

(51) Int. Cl.
*F21V 23/04* (2006.01)
*F21V 23/06* (2006.01)

(58) Field of Classification Search
CPC ........ F21V 3/02; F21V 31/00; F21V 33/0052; F21V 17/164; F21V 19/001; F21V 23/04; F21Y 2115/10
See application file for complete search history.

(56) References Cited

FOREIGN PATENT DOCUMENTS

| | | | | |
|---|---|---|---|---|
| CN | 103148380 A | | 6/2013 | |
| CN | 204901458 U | | 12/2015 | |
| CN | 105465758 A | | 4/2016 | |
| CN | 206361548 U | | 7/2017 | |
| CN | 107504456 A | | 12/2017 | |
| CN | 207038067 U | | 2/2018 | |
| CN | 108087793 A | | 5/2018 | |
| CN | 108954070 | * | 12/2018 | .............. F21S 6/002 |
| CN | 208491485 U | | 2/2019 | |
| CN | 109869673 A | | 6/2019 | |
| CN | 209146971 U | | 7/2019 | |
| CN | 110242883 A | | 9/2019 | |
| CN | 110288918 A | | 9/2019 | |
| CN | 209511684 U | | 10/2019 | |
| CN | 111028712 A | | 4/2020 | |
| CN | 111765396 A | | 10/2020 | |

OTHER PUBLICATIONS

CN 204901458, Ping Shang, Dec. 23, 2015, "Reading Lamp", English Translation (Year: 2015).*

China National Intellectual Property Administration, First office action of Chinese application No. 202010673846.7 dated Sep. 27, 2021, which is foreign counterpart application of this US application.

China National Intellectual Property Administration, Notification to grant patent right for invention of Chinese application No. 202010673846.7 dated Feb. 18, 2022, which is foreign counterpart application of this US application.

* cited by examiner

LIGHTING APPARATUS

CROSS-REFERENCE TO RELATED APPLICATION

This application is a 371 of PCT application No. PCT/CN2021/098913, filed on Jun. 8, 2021, which claims priority to Chinese Patent Application No. 202010673846.7, filed on Jul. 14, 2020 and entitled "LIGHTING APPARATUS", the disclosures of which are incorporated herein by reference in their entireties.

TECHNICAL FIELD

The present disclosure relates to the field of electronic device technologies, and in particular, relates to a lighting apparatus.

BACKGROUND

Lighting apparatuses are indispensable interior decorations in people's daily life. Generally, lighting apparatuses can be hung on ceilings, or placed on tabletops.

SUMMARY

Embodiments of the present disclosure provide a lighting apparatus. The technical solution is as follows.

A lighting apparatus is provided, including a lamp body assembly including a support base, a lampshade mounted on the support base, and a light-emitting body, a power supply module and a first connector that are connected to the support base, wherein the light-emitting body is electrically connected to the power supply module;

a display assembly including: a carrier, a second connector connected to the carrier and facing one side of the support base, and a display screen connected to the carrier, wherein the display screen is electrically connected to the power supply module; and a support assembly connected to the first connector and the second connector.

Optionally, the support assembly is sleeved outside the lampshade, a first end of the support assembly is connected to the first connector, and a second end of the support assembly is connected to the second connector.

Optionally, the support assembly includes a plurality of strip-shaped blades, wherein a first end of each of the strip-shaped blades is provided with a first slot facing the support base and connected to the first connector, and a second end of each of the strip-shaped blades is provided with a second slot facing the carrier and connected to the second connector.

Optionally, the first connector has an annular first protruding structure, the second connector has an annular second protruding structure, the first slot of each of the strip-shaped blades is engaged with the first protruding structure, and the second slot of each of the strip-shaped blades is engaged with the second protruding structure.

Optionally, the carrier includes: a sub-carrier connected to an end, distal from the support base, of the lampshade, and a first carrying plate connected to the sub-carrier, wherein a surface, distal from a light-emitting surface, of the display screen is bonded to a surface, distal from the sub-carrier, of the first carrying plate.

Optionally, the surface, distal form the sub-carrier, of the first carrying plate is provided with a carrying slot, and the display screen is disposed in the carrying slot.

Optionally, the carrier further includes a second carrying plate connected to the sub-carrier, and the display assembly further includes a drive circuit board fixedly connected to a surface, distal from the sub-carrier, of the second carrying plate, the drive circuit board being electrically connected to the display screen.

Optionally, the display screen includes: a display panel, and a printed circuit board with a first end electrically connected to the display panel, wherein a second end of the printed circuit board is electrically connected to the drive circuit board, and the surface, distal from the light-emitting surface, of the display panel is bonded to the surface, distal from the sub-carrier, of the first carrying plate.

Optionally, the display panel is a flexible display panel, the printed circuit board is a flexible printed circuit board, and the surface, distal from the sub-carrier, of the first carrying plate is an arched arc surface.

Optionally, two display screens are disposed in the display assembly, and in the two display screens, ends, distal from the printed circuit board, of the two display panels are stitched to each other.

Optionally, the surface, distal from the sub-carrier, of the first carrying plate is provided with a strip-shaped positioning structure, two display screens are disposed in the display assembly, and an end, distal from the flexible circuit board, of each of the display panels is stitched to the positioning structure.

Optionally, the display assembly further includes a transparent protective housing sleeved on the carrier, wherein the display screens are disposed between the transparent protective housing and the first carrying plate.

Optionally, the display screen further includes a touch panel disposed on a side, distal from the first carrying plate, of the display panel.

Optionally, the lighting apparatus further includes a wire barrel, wherein the support base is connected to a first end of the wire barrel, the carrier and the lampshade are both sleeved on the wire barrel, and a wire for connecting the display screen to the power supply module is housed in the wire barrel.

Optionally, the lighting apparatus further includes a switch assembly disposed on a second end of the wire barrel, wherein the switch assembly is electrically connected to the power supply module.

Optionally, the lighting apparatus further includes a sealing protective cover, wherein the sealing protection cover is sleeved on the wire barrel and disposed between the switch assembly and the carrier.

BRIEF DESCRIPTION OF THE DRAWINGS

For clearer descriptions of the technical solutions in the embodiments of the present disclosure, the following briefly introduces the accompanying drawings required to be used in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

For clearer descriptions of the objectives, technical solutions, and advantages of the present disclosure, the embodiments of the present disclosure are further described in detail hereinafter in conjunction with the accompanying drawings.

A traditional lighting apparatus can generally be used only as a lighting tool, and thus has a single function.

Figure 1:
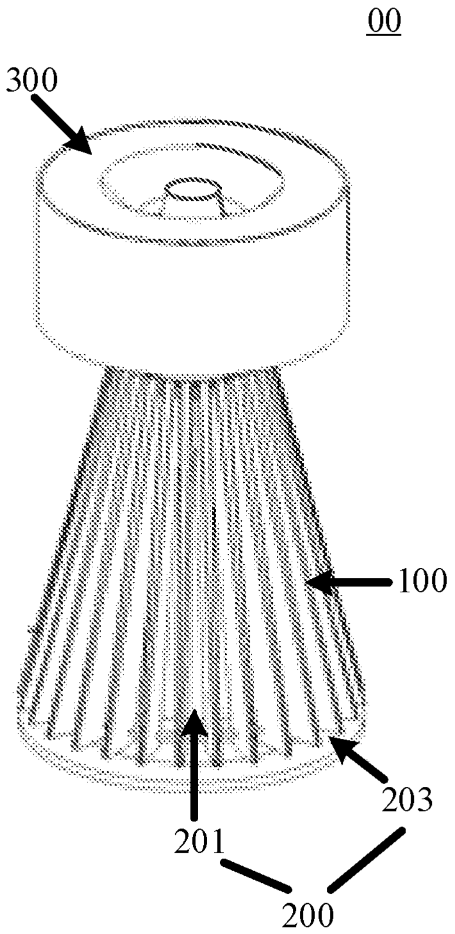
FIG. 1 is a schematic structural diagram of a lighting apparatus according to an embodiment of the present disclosure.

Referring to FIG. 1, it is a schematic structural diagram of a lighting apparatus according to an embodiment of the present disclosure. The lighting apparatus 00 may include a support assembly 100, a lamp body assembly 200 and a display assembly 300.

The lamp body assembly 200 may include a support base 203, a lampshade 201 mounted on the support base 203, and a light-emitting body (a light-emitting body 202 is not marked in FIG. 1), a power supply module (a power supply module 204 is not marked in FIG. 1) and a first connector (a first connector 205 is not marked in FIG. 1), which are all connected to the support base 203. The light-emitting body 202, the power supply module 204 and the first connector 205 may all be disposed between the support base 203 and the lamp body assembly 200. That is, the light-emitting body 202, the power supply module 204 and the first connector 205 may all be disposed within the lampshade 201. The light-emitting body 202, the power supply module 204 and the first connector 205 may all be disposed within the support base 203, as long as light emitted by the light-emitting body 202 is emitted from the support base 203. This is not limited in the embodiments of the present disclosure.

In the present disclosure, the power supply module 204 may be electrically connected to the light-emitting body 202, and is capable of supplying power to the light-emitting body 202, such that the light-emitting body 202 is capable of emitting light.

Figure 2:
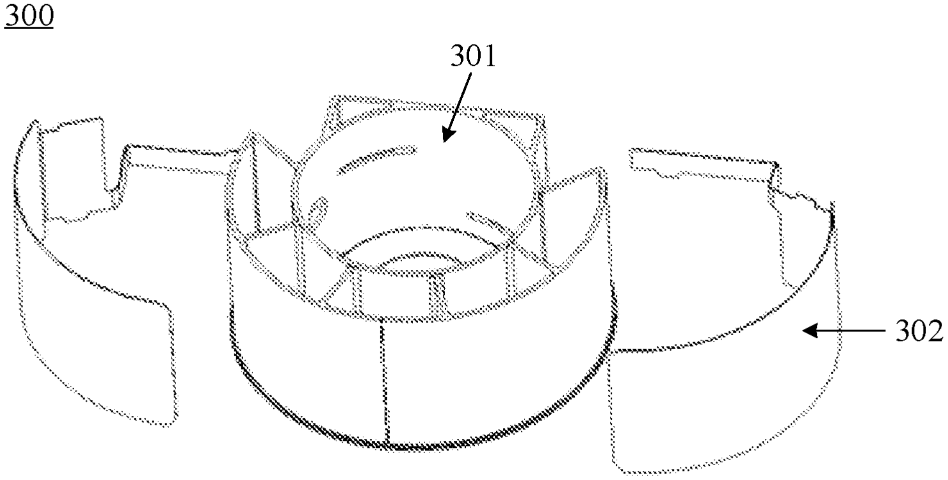
FIG. 2 is an exploded view of a display assembly according to an embodiment of the present disclosure.

For clearer observation of the structure of the display assembly 300, referring to FIG. 2, FIG. 2 is an exploded view of a display assembly according to an embodiment of the present disclosure. The display assembly 300 may include a carrier 301, a second connector connected (a second connector 303 is not marked in FIG. 2) to the carrier 301 and facing the support base 203, and a display screen 302 connected to the carrier 301.

In the present disclosure, the power supply module 204 may also be electrically connected to the display screen 302, and is capable of supplying power to the display screen 302, such that the display screen 302 is capable of displaying pictures.

The support assembly 100 may be connected to the first connector 205 in the lamp body assembly 200 and the second connector 303 in the display assembly 300. In this way, the connection between the lamp body assembly 200 and the display assembly 300 may be implemented by the support assembly 100.

In the embodiment of the present disclosure, the display screen 302 in the display assembly 300 in the lighting apparatus 00 is capable of displaying pictures, for example, image pictures or video pictures. The light-emitting body 202 in the lamp body assembly 200 in the lighting apparatus 00 is capable of emitting light. Therefore, the lighting apparatus 00 has both a lighting function and a display function.

In summary, the lighting apparatus according to the embodiment of the present disclosure includes the support assembly, the lamp body assembly and the display assembly. The light-emitting body in the lamp body assembly is capable of emitting light, and the display screen in the display assembly is capable of displaying pictures. Accordingly, the lighting apparatus has both a lighting function and a display function, which effectively enriches the functions of the lighting apparatus.

Figure 3:
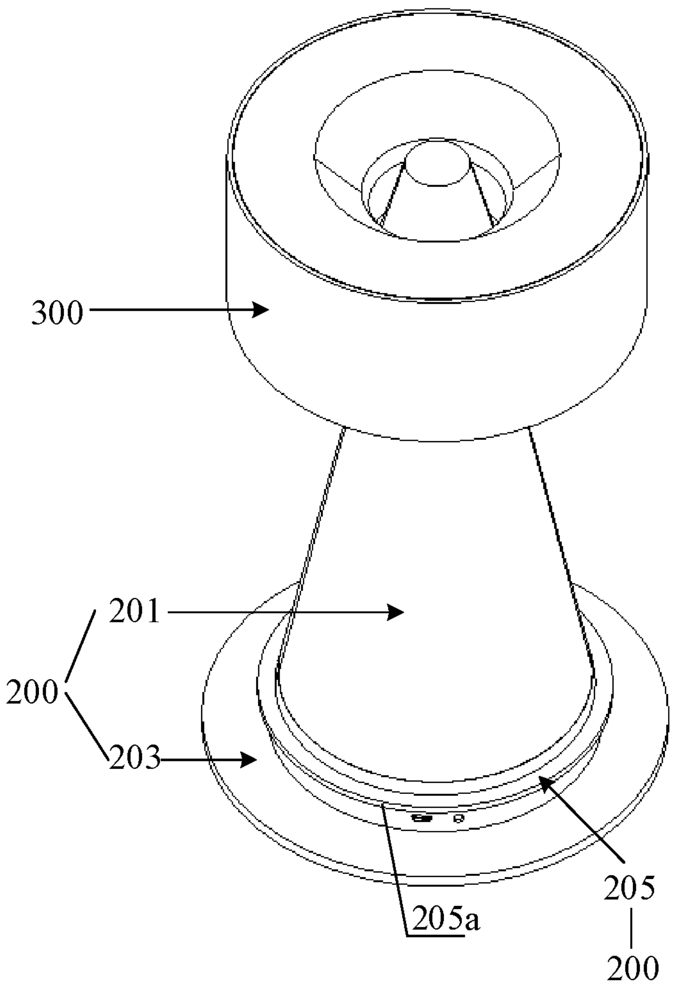
FIG. 3 is a schematic structural diagram of a lighting apparatus from one side, without a support assembly assembled, according to an embodiment of the present disclosure.
Figure 4:
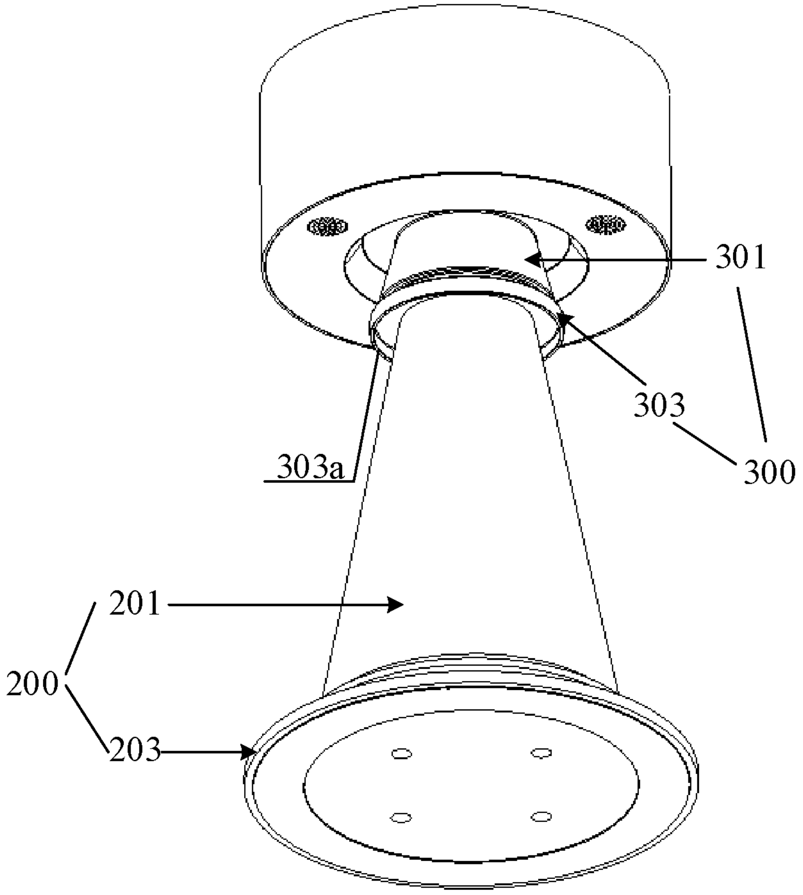
FIG. 4 is a schematic structural diagram of the lighting apparatus shown in FIG. 3 from the other side.

In order to observe of the structures of the first connector 205 and the second connector 303 more clearly, referring to FIG. 3 and FIG. 4, FIG. 3 is a schematic structural diagram of a lighting apparatus from one side, without a support assembly assembled, according to an embodiment of the present disclosure, and FIG. 4 is a schematic structural diagram of the lighting apparatus shown in FIG. 3 from the other side. The first connector 205 in the lamp body assembly 100 and the second connector 303 in the display assembly 300 may be disposed at two ends of the lampshade 201, respectively.

Figure 5:
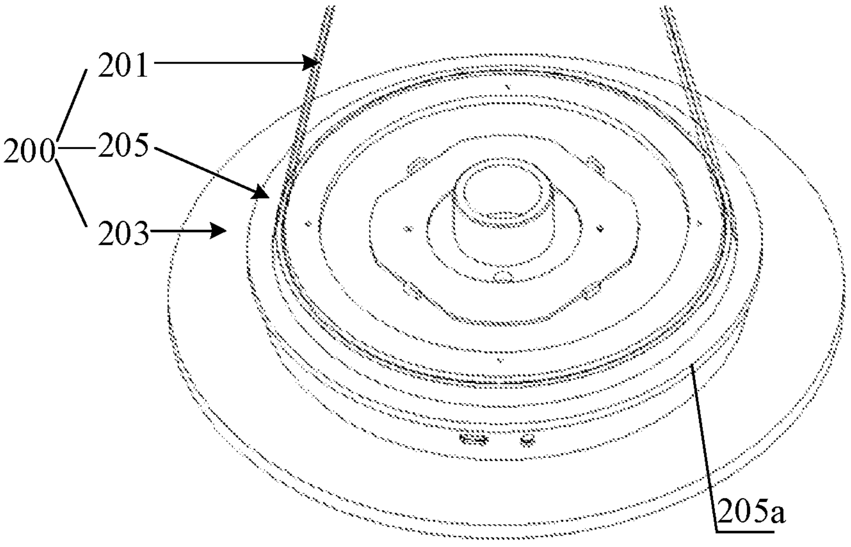
FIG. 5 is a partial enlarged view of the lighting apparatus shown in FIG. 3 from one side.
Figure 6:
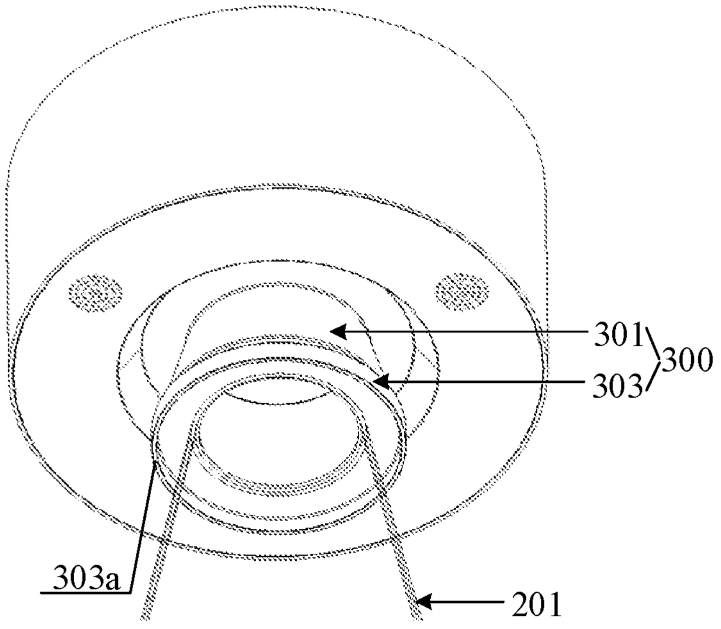
FIG. 6 is a partial enlarged view of the lighting apparatus shown in FIG. 3 from the other side.

For example, as shown in FIG. 5 and FIG. 6, FIG. 5 is a partial enlarged view of the lighting apparatus shown in FIG. 3 from one side, and FIG. 6 is a partial enlarged view of the lighting apparatus shown in FIG. 3 from the other side. One end of the lampshade 201 may be butted against the support base 203, and the other end of the same may be butted against the carrier 301.

Figure 7:
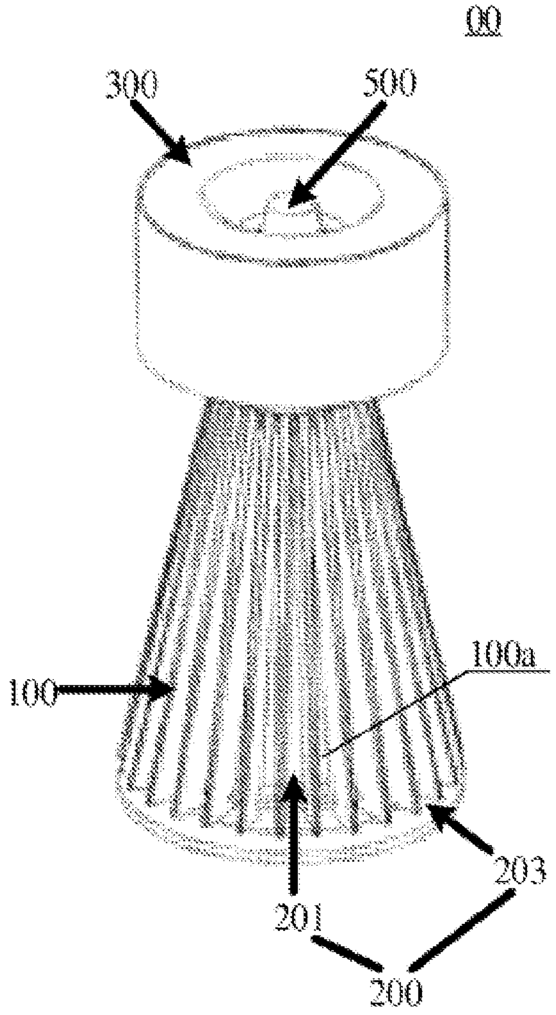
FIG. 7 is a schematic structural diagram of another lighting apparatus according to an embodiment of the present disclosure.
Figure 8:
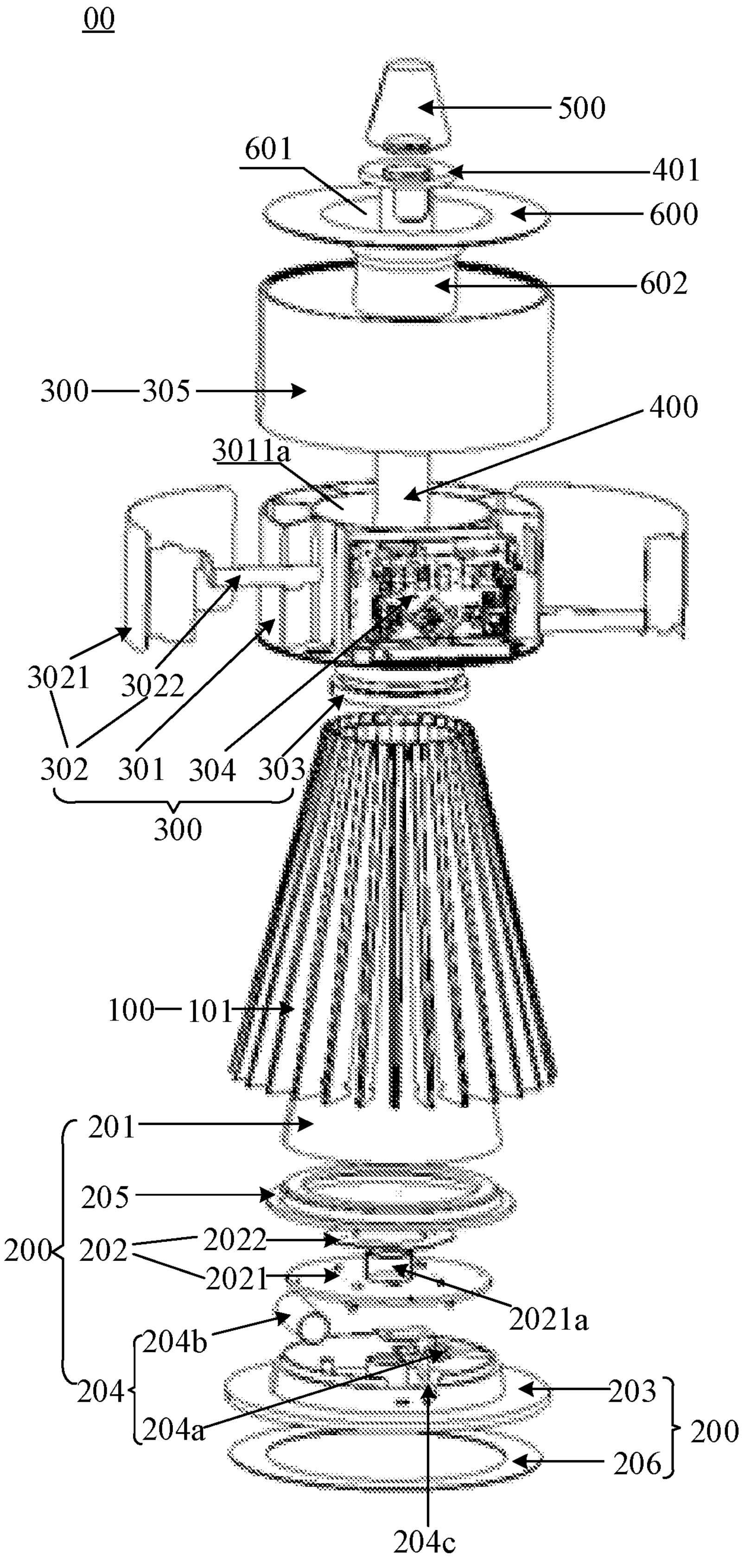
FIG. 8 is an exploded view of the lighting apparatus shown in FIG. 7.

In such a way, referring to FIG. 7 and FIG. 8, FIG. 7 is a schematic structural diagram of another lighting apparatus according to an embodiment of the present disclosure, and FIG. 8 is an exploded view of the lighting apparatus shown in FIG. 7. The support assembly 100 may be sleeved outside the lampshade 201. A first end of the support assembly 100 may be connected to the first connector 205, and the second end of the support assembly 100 may be connected to the second connector 303. In the present disclosure, the support assembly 100 has a hollowed-out region 100*a*. The light emitted by the light-emitting body 202 may be emitted from the lamp body assembly 200 through the hollowed-out region 100*a* in the support assembly 100.

Figure 9:
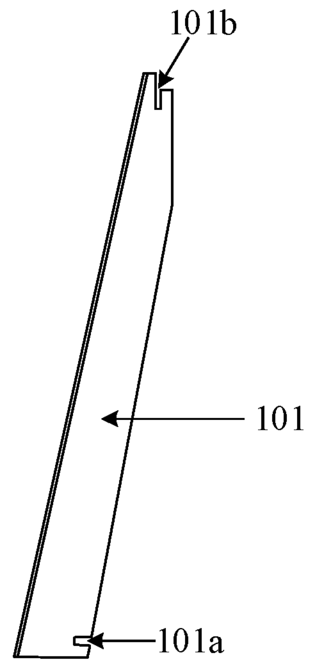
FIG. 9 is a schematic structural diagram of a blade according to an embodiment of the present disclosure.

Optionally, the support assembly 100 may include a plurality of strip-shaped blades 101 distributed outside the lampshade 201. As shown in FIG. 9, FIG. 9 is a schematic structural diagram of a blade according to an embodiment of the present disclosure. A first end of each of the blades 101 is provided with a first slot 101*a* facing the support base 203 of the lamp body assembly 200, and the first slot 101*a* may be connected to the first connector 205 on the support base 203. A second end of each of the blades 101 has a second slot 101*b* facing the carrier 301 in the display assembly 300, and the second slot 101*b* may be connected to the second connector 303 on the carrier 301. In the present disclosure, among the plurality of strip-shaped blades 101, a region between any two adjacent blades 101 is the hollowed-out region 100*a* in the support assembly 100.

As an example, as shown in FIG. 3 to FIG. 6, the first connector 205 on the support base 203 of the lamp body assembly 200 has an annular first protruding structure 205*a*. The second connector 303 on the carrier 301 of the display assembly 300 has an annular second protruding structure 303*a*.

The first slot 101*a* of each of the blades 101 may be engaged with the first protruding structure 205*a* on the first connector 205, thereby connecting the first end of the blade 101 to the first connector 205. The second slot 101*b* of each of the blades 101 may be engaged with the second protruding structure 303*a* on the second connector 303, thereby connecting the second end of the blade 101 to the second connector 303.

It should be noted that an extending direction of the first slot 101*a* intersects with an extending direction of the second slot 101*b*. In this way, in the case that the first slot 101*a* is engaged with the first protruding structure 205*a*, and the second slot 101*b* is engaged with the second protruding structure 303*a*, the blades 101 are not easy to fall off, which effectively improves the stability of the plurality of blades 101 in the support assembly 100. Therefore, the stability in connecting the lamp body assembly 200 with the display assembly 300 by the support assembly 100 is effectively improved.

Optionally, each of the blades 101 is inclined, and the size of the first protruding structure 205*a* is larger than the size of the second protruding structure 303*a*.

In an exemplary embodiment, both the first protruding structure 205*a* and the second protruding structure 303*a* may be annular protruding structures. In this way, the diameter of the first protruding structure 205*a* is larger than the diameter of the second protruding structure 303*a*. In this case, the shape of the lampshade 201 of the lamp body assembly 200 may be shaped as a truncated cone, and the diameter of an end of the lampshade 201 close to the first connector 205 is larger than the diameter of an end of the lampshade 201 close to the second connector 303.

In another exemplary embodiment, both the first protruding structure 205*a* and the second protruding structure 303*a* may be square annular protruding structures. In this way, the width of the first protruding structure 205*a* is larger than the width of the second protruding structure.

In still another exemplary embodiment, both the first protruding structure 205*a* and the second protruding structure 303*a* may be irregular annular protruding structures. In this way, it is necessary to ensure that the area of an annular structure defined by the first protruding structure 205*a* is larger than the area of an annular structure defined by the second protruding structure 303*a*.

Optionally, the plurality of strip-shaped blades 101 of the support assembly 100 are arranged in an equidistant circular array with an axis of the lampshade 201 as a center axis. That is, the plurality of blades 101 may be evenly distributed outside the lampshade 201.

In the embodiment of the present disclosure, the blades 101 of the lamp body assembly 200 are generally supported by an opaque material. Therefore, in the lamp body assembly 200, the blades 101 are light-opaque, and the region (i.e., the hollowed-out region 100*a*) between any two adjacent blades 101 is light-transmissible. In this way, after the light emitted by the light-emitting body 202 in the lamp body assembly 200 is emitting through the plurality of blades 101, the light emitted by the light-emitting body 202 may present light and dark strip-shaped light spots by means of the plurality of blades 101, which effectively enhances the aesthetic property of the lamp body 00 during lighting.

Figure 10:
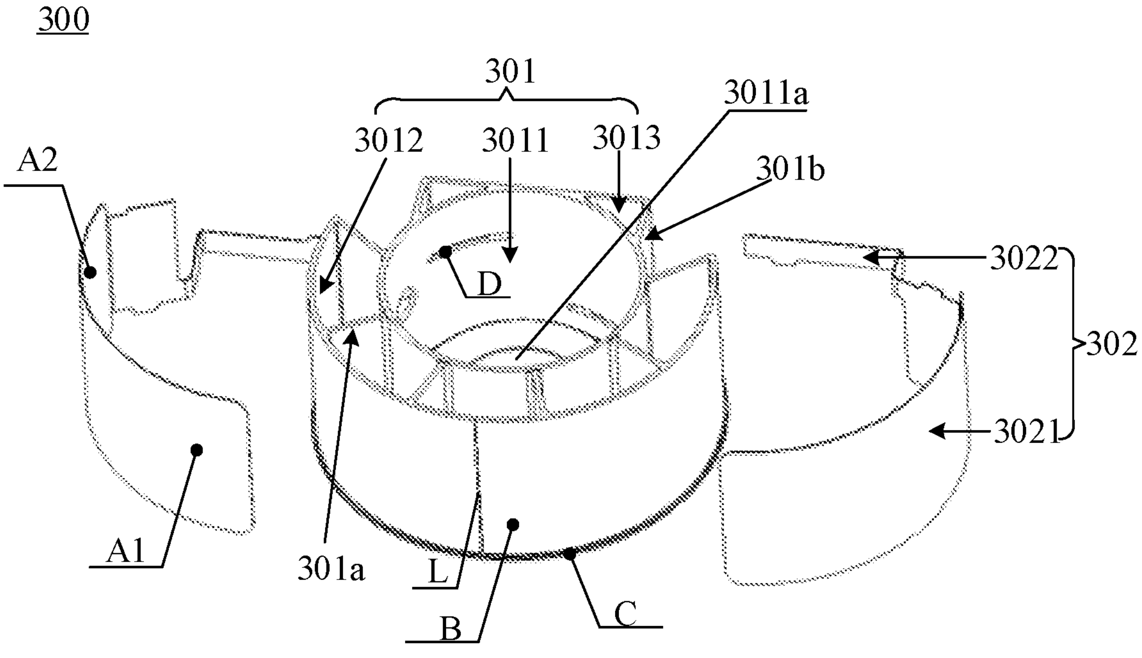
FIG. 10 is an exploded view of another display assembly according to an embodiment of the present disclosure.

Optionally, referring to FIG. 8 and FIG. 10, FIG. 10 is an exploded view of another display assembly according to an embodiment of the present disclosure. The carrier 301 of the display assembly 300 may include a sub-carrier 3011 and a first carrying plate 3012. The sub-carrier 3011 may be connected to the end, distal from the support base 203, of the lampshade 201 of the light emitting assembly 200, and the first carrying plate 3012 may be connected to the sub-carrier 3011. For example, the first carrying plate 3012 may be connected to the sub-carrier 3011 by evenly distributed grids 301*a*, by which the overall strength of the carrier 301 can be increased, such that the carrier 301 better facilitates the connection to the display screen 302.

In the embodiment of the present disclosure, a surface, distal form the light-emitting surface A1, A2 of the display screen 302 may be bonded to a surface B, distal form the sub-carrier 3011, of the first carrying plate 3012. For example, the surface A2, distal form the light-emitting surface A1, of the display screen 302 may be bonded to the surface B, distal form the sub-carrier 3011, of the first carrying plate 3012 by an adhesive. For example, the adhesive be an SCF film, which may be a multi-film-layer structure composed of an acrylic layer, a metallic copper layer, a release film, foam and the like. The SCF film is capable of shielding signal interferences to prevent screen splashes or other poor display phenomena in the case that the display screen 202 displays a picture.

Optionally, the surface B, distal form the sub-carrier 3011, of the first carrying plate 3012 is provided with a carrying slot (not marked in FIG. 7), in which the display screen 302 may be disposed. For example, a third protruding structure C is arranged on at least one of the two sides of the first carrying plate 3012. FIG. 10 schematically illustrates that the third protruding structure C is arranged on one side of the first carrying plate 3012 close to the lamp body assembly 200. The carrying slot is formed by the first carrying plate 3012 and the third protruding structure C disposed on at least one side of the first carrying plate 3012. Providing the carrying slot on the first carrying plate 3012 avoids the bonding shift that occurs when the display screen 302 is bonded on the first carrying plate 3012, which better facilitates the connection between the display screen 302 and the first carrying plate 3012.

In the embodiment of the present disclosure, as shown in FIGS. 8 and 10, the carrier 301 in the display assembly 300 may further include a second carrying plate 3013 connected to the carrier 3011. The display assembly 300 may further include a drive circuit board 304 fixedly connected to a surface, distal form the sub-carrier 3011, of the second carrying plate 3013. The drive circuit board 304 is electrically connected to the display screen 302. The drive circuit board 304 is capable of driving the display screen 302 to display pictures.

Optionally, the second carrying plate 3013 may be connected to the sub-carrier 3011 by a connecting grid 301*b*. The second carrying plate 3013 may be a rectangular carrying plate matching the drive circuit board 304 in shape. The drive circuit board 304 may be fixedly connected to the second carrying plate 3013 by fixing members such as screws. It should be noted that the second connector 303 on the carrier 301, and the sub-carrier 3011, the first carrying plate 3012, the second carrying plate 3013, the grids 301*a* and the connecting grid 301*b* of the carrier 301 are an integral structure, and the carrier 301 may generally be integrally formed by injection molding or machining.

As an example, the display screen 302 may include a display panel 3021, and a printed circuit board 3022 with a first end electrically connected to the display panel 3021. A second end of the printed circuit board 3022 may be electrically connected to the drive circuit board 304. A surface A2, distal form the light-emitting surface A1, of the display panel 3021 may be bonded to the surface B of the first carrying plate 3012 distal form the sub-carrier 3011. The drive circuit board 304 is capable of driving the display panel 3021 to display pictures by the printed circuit board 3022. As an example, the display panel 2021 has a plurality of light-emitting components arranged in an array, and each of the light-emitting components may include a red light-emitting sub-component, a green light-emitting sub-component and a blue light-emitting sub-component. The drive circuit board 304 may drive, based on picture data to be displayed, the individual light-emitting sub-components in the display panel 3021 to emit light, such that the display panel 3021 can display a picture corresponding to the picture data to be displayed.

Optionally, the display panel 3021 may be a flexible display panel. For example, the flexible display panel may be an organic light-emitting diode (OLED) display panel. The printed circuit board 3022 may be a flexible printed circuit board. The surface, distal form the sub-carrier 3011, of the first carrying plate 3012 is an arched arc surface. In this way, the first carrying plate 3012 is an arched arc carrying plate.

Figure 11:
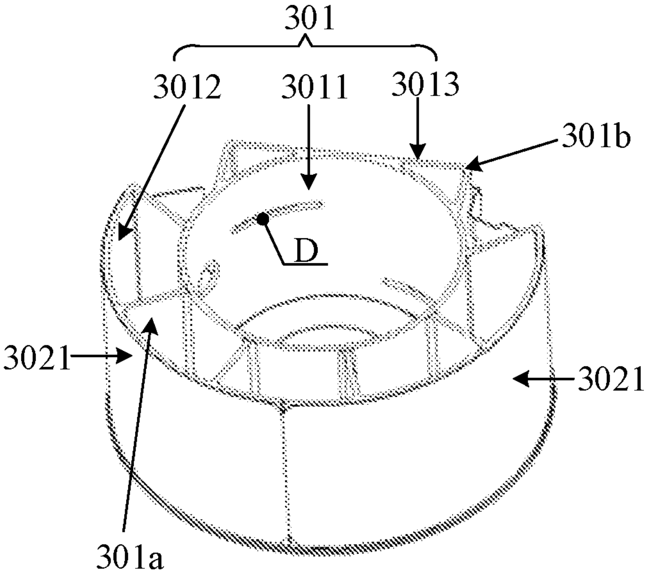
FIG. 11 is a schematic diagram of the assembled display assembly shown in FIG. 10.

In the embodiment of the present disclosure, as shown in FIG. 10 and FIG. 11, FIG. 11 is a schematic diagram of the display assembly shown in FIG. 10 upon assembly, and two display screens 302 are disposed in the display assembly 300.

In an exemplary embodiment, in the two display screens 302, the ends, distal form the printed circuit board 3022, of the two display panels 3021 are stitched to each other, such that the two display panels 3021 form a stitched screen.

In another exemplary embodiment, the surface, distal form the sub-carrier 3011, of the first carrying plate 3012 is provided with a strip-shaped positioning structure L, which may be disposed within the carrying slot in the first carrying plate 3012, and the length direction of the strip-shaped positioning structure L may be perpendicular to the length direction of the carrying slot. One end, distal form the printed circuit board 3022, of each of the display panels 3021 may be stitched to the positioning structure L, such that the two display panels 3021 form a stitched screen. In the embodiment, in the case that the two display panels 3021 are assembled within the carrying slot, an operator may align the end, distal form the printed circuit board 3022, of each of the display panels 3021, with the positioning structure L, and then press the display panels 3021 clockwise or counter-clockwise, such that the display panels 3021 are bonded to the surface, distal form the sub-carrier 3011, of the first carrying plate 3012.

It should be noted that the “stitched” in the above embodiment indicates that two structures (for example, the ends, distal form the printed circuit board 3022, of the two display panels 3021) are engaged with each other, or, a small gap, with a width that may be less than 1 mm, is present between the two structures.

The current display panel 3021 is difficult to bend at a large radian. Therefore, in the case that a piece of display panel 3021 is bonded onto the arched arc first carrying plate 3012, the area of a display region in the display assembly 300 is small. In the case that two stitched display panels 3021 are bonded onto the arched arc first carrying plate 3012, the two stitched display panels 3021 may be stitched into a curved-surface stitched screen for which a large radian is possible, which effectively increases the area of the display region in the display assembly 300.

Moreover, each of the display panels 3021 in the display assembly 300 may be electrically connected to the drive circuit board 304 by the respective flexible circuit board 2022. Therefore, the drive circuit board 304 may not only drive the splicing screen formed by splicing the two display panels 3021 to display a stitched picture, but also drive the two display panels 3021 to display two different pictures, which effectively enriches the types of pictures displayed by the display assembly 300.

Optionally, the display screen 302 may further include a touch panel (not marked in the figure) disposed on a side, distal form the first carrying plate 3012, of the display panel 200. The touch panel is capable of detecting a touch operation, so as to control a picture content displayed on the display panel 200 and control light-emitting parameters of the light-emitting body 201.

As an example, the lighting apparatus 00 may further include a control assembly, which may be integrated in the drive circuit board 304. The control assembly is connected to the display panel 3021 and the light-emitting body 201. The control assembly is configured to receive the touch operation detected by the touch panel and control the light-emitting parameters of the light-emitting body based on the touch operation. The control assembly is further configured to receive the touch operation detected by the touch panel and control the display content of the display panel 3021 based on the touch operation. The light-emitting parameters may include at least one of luminance, light color temperature and light color.

In the embodiment of the present disclosure, as shown in FIG. 8, the display assembly 300 may further include a transparent protective housing 305 sleeved on the carrier 301. The display screen 302 of the display assembly 300 may be disposed between the transparent protective housing 305 and the first carrying plate 3012. The display screen 302 may be protected by the transparent protective housing 305, so as to avoid display effect deterioration caused by abrasion of the display screen 302. As an example, the transparent protective housing 305 may be a cylindrical housing, and a radius of the transparent protective housing 305 is approximately the same as the radius of the arched arc first carrying plate 3012. In general, the radius of the transparent protective housing 305 is slightly larger than the radius of the arc first carrying plate 3012. In the present disclosure, the transparent protective housing 305 may be abutted against the third protruding structure C on the first carrying plate 3012 of the carrier 301.

In the embodiment of the present disclosure, as shown in FIG. 8, the lighting apparatus 00 may further include a wire barrel 400. A first end of the wire barrel 400 may be connected to the support base 203. Both the carrier 301 of the display assembly 300 and the lampshade 201 of the lamp body assembly 200 may be sleeved on the wire barrel 400. The wire barrel 400 may be a cylindrical hollow conduit and is provided therein with a connecting wire (not depicted in FIG. 4) for connecting the display screen 302 to the power supply module 204. Because the connecting wire for connecting the display screen 302 to the power supply module 204 is disposed within the wire barrel 400, unnecessary wiring would not be conducted outside the lighting apparatus 00, which effectively improves the aesthetic property of the lighting apparatus 00. For example, as shown in FIG. 10, the sub-carrier 3011 is provided thereon with a strip-shaped wiring hole D, through which the connection wire in the wire barrel 400 may be connected to the drive circuit board 304 of the display assembly 300. Due to a connection relationship between the drive circuit board 304 and the display screen 302, the connecting wire in the wire barrel 400 may be connected to the display screen 302 by the drive circuit board 304.

In the present disclosure, the light-emitting body 202 of the lamp body assembly 200 may include a lamp holding plate 2021 and a light-emitting diode (LED) lamp 2022 disposed on the lamp holding plate 2021. The lamp holding plate 2021 may be fixedly connected to the LED light 2022 by screws. The lamp holding plate 2021 is disposed on the support base 203 and may be fixedly connected to the support base 203 by screws. The lamp holding plate 2021 has a threaded connector 2021*a*, which has a female thread, and the first end of the wire barrel 400 has a male thread matched with the female thread. Therefore, in the case that the first end of the wire barrel 500 is connected to the threaded connector 2021*a* on the lamp holding plate 2021 by the threads, the connection between the first end of the wire barrel 400 and the support base 203 may be achieved.

As shown in FIGS. 8 and 10, the sub-carrier 3011 of the carrier 301 has a through hole 3011*a* that matches the wire barrel 400 in shape, and the carrier 301 may be sleeved on the wire barrel 400 through the through hole 3011*a* in the sub-carrier 3011.

As shown in FIG. 8, because the lampshade 201 may be butted against the support base 203 at one end thereof and butted against the carrier 301 at the other end thereof, the lampshade 201 may be sleeved on the wire barrel 400 by the support base 203 and the carrier 301.

In the embodiment of the present disclosure, as shown in FIG. 4, the power supply module 204 on the support base 203 may include a power interface 204*a* and a battery assembly 204*b* connected to the power interface 204*a*. The battery assembly 204*b* is electrically connected to the light-emitting body 201 and the display screen 302. The light-emitting body 201 and the display screen 302 may be supplied with electric energy by the battery assembly 204*b*, and the battery assembly 204*b* may be charged via the power interface 204*a*.

Optionally, as shown in FIG. 4, the support base 203 is further provided with a data interface 204*c*, which may be electrically connected to the drive circuit board 304 by a data line disposed in the wire barrel 400. A picture content to be displayed may be sent to the drive circuit board 304 via the data interface 204*c*, such that the drive circuit board 304 may drive the display screen 302 to display the picture content. In other possible embodiments, the data interface 204*c* and the power interface 204*a* may be the same interface.

Optionally, as shown in FIGS. 7 and 8, the lighting apparatus 00 may further include a switch assembly 500 disposed on the second end of the wire barrel 400, and the switch assembly 500 may be electrically connected to the power supply module 204. As an example, the switch assembly 500 and the power supply module 204 may be electrically connected by the connecting wire disposed in the wire barrel 400. In the embodiment of the present disclosure, the switch assembly 500 may be a touch switch, and may be connected by threads to the second end of the wire barrel 400. The switch assembly 500 is capable of controlling the power supply module 204 to supply power to the light-emitting body 202 and the display screen 302 and may also control the power supply module 204 to stop supplying power to the light-emitting body 202 and the display screen 302.

Optionally, as shown in FIG. 4, the lighting apparatus 00 may further include a sealing protective cover 600, which is sleeved on the wire barrel 400 and disposed between the switch assembly 500 and the carrier 201 in the display assembly 300. The sealing protective cover 600 can avoid the problem on display effect deterioration of the display screen 201 in the display assembly 300 due to small particulate matters such as dust entering into the display assembly 300. As an example, the sealing protective cover 600 may be made of either a metal material or a plastic material. In the case that the sealing protective cover 600 is made of a metal material, the surface of the sealing protective cover 600 may be treated by a wire drawing process or a painting process. In the case that the sealing protective cover 600 is made of a plastic material, the surface of the sealing protective cover 600 may be treated by the painting process or an electroplating process.

In the embodiment of the present disclosure, the sealing protective cover 600 may be connected to the curved-surface protective housing 304 of the display assembly 300 by means of bonding. In the case that the sealing protective cover 600 is bonded to the curved-surface protective housing 304, a curved-surface barrier for protecting the display screen 302 may be formed. In the present disclosure, the curved-surface barrier and the carrier 301 of the display assembly 300 may be fixed under the thread fit between the wire barrel 400 and the touch switch 500. For example, in the case that the curved-surface protective housing 304 is sleeved on the carrier 301 and butted against the third protruding structure C on the first carrying plate 3012 in the carrier 301, the sealing protective cover 600 is installed on the side, distal form the lamp body assembly 200, of the curved-surface housing 304, and the wire barrel 400 and the touch switch 500 are tightened, whereby the curved-surface housing 304 and the carrier 301 can be fixed.

As an example, the second end of the wire barrel 400 is provided with a snap-fit protrusion 401, and the sealing protective cover 600 is provided with a snap-fit groove 601 matching the snap-fit protrusion 401 in shape. By the mutual snap-fit cooperation between the snap-fit protrusion 401 and the snap-fit groove 601, the sealing protective cover 600 can be sleeved on the wire barrel 400, and moreover, the sealing protective cover 600 can be prevented from falling off from the wire barrel 400 in the case that the first end of the wire barrel 400 is connected to the support base 203.

The sealing protective cover 600 is further provided with a support protrusion 602 matching the shape of the through hole 3011*a* in the sub-carrier 3011. The support protrusion 602 is disposed within the through hole 3011*a*, and an outer wall of the support protrusion 602 may be butted against an inner wall of the sub-carrier 3011 (i.e., a side wall of the through hole 3011*a*). The sub-carrier 3011 may be supported by the support protrusion 602, such that the sub-carrier 3011 is prevented from swinging upon being sleeved on the wire barrel 400, which effectively improves the stability of the display assembly 200.

Optionally, as shown in FIG. 8, the lamp body assembly 200 may further include an anti-skid gasket 206 connected to the side, distal form the light-emitting body 202, of the support base 203. The anti-skid gasket 206 may generally be made of a rubber material. The anti-skid gasket 206 may prevent the lighting apparatus 00 from slipping.

In the embodiment of the present disclosure, the lighting apparatus 00 may be disposed on a tabletop in a place such as a restaurant or a coffee shop, and the display screen 202 in the lighting apparatus 00 may display video advertisements. In this way, the lighting apparatus 00 may be used for commercial purposes.

In conjunction with the above embodiments, the embodiment of the present disclosure further provides a method for assembling a lighting apparatus. The method for assembling the lighting apparatus is as follows.

First, an operator may fix the drive circuit board 304 on the second carrying plate 3013 in the carrier 301, simultaneously bond the display panel 3021 into the carrying slot of the first carrying plate 3012 in the carrier 301, and connect the printed circuit board 3022 to the drive circuit board 304.

Then, the operator may connect the first end of each of the plurality of blades 101 to the first connector 205 on the support base 203 and the second end of the same to the second connector 303 on the carrier 301 and place the lampshade within the annular region defined by the plurality of blades 101.

Then, the operator may assemble the light-emitting body 202 and the power supply module 204 on the support base 203, and install the anti-skid gasket 206 on the side, distal form the light-emitting body 202, of the support base 203.

Finally, the operator may install the touch switch 500 on the second end of the wire barrel 400, and pass the first end of the wire barrel 400 through the sealing protective cover 600, the sub-carrier 3011 (also the curved-surface protective housing 304) of the carrier 301 and the lampshade 201 (also the annular region defined by the plurality of blades 101) in sequence, to be connected by threads to the lamp holding plate 2021 of the light-emitting body 202, thereby achieving the assembly of the lighting apparatus 00.

In summary, the lighting apparatus according to the embodiment of the present disclosure includes the support assembly, the lamp body assembly and the display assembly. The light-emitting body in the lamp body assembly is capable of emitting light, and the display screen in the display assembly can display pictures. Accordingly, the lighting apparatus has both a lighting function and a display function, which effectively enriches the functions of the lighting apparatus.

In the present disclosure, the terms "first" and "second" are for descriptive purposes only and are not to be construed as indicating or implying relative importance. The term "a plurality of" refers to two or more, unless otherwise specifically defined.

Described above are merely optional embodiments of the present disclosure, and are not intended to limit the present disclosure. Within the spirit and principles of the disclosure, any modifications, equivalent substitutions, improvements, and the like should be included within the protection scope of the present disclosure.

What is claimed is:

1. A lighting apparatus, comprising:

a lamp body assembly, comprising: a support base, a lampshade mounted on the support base, and a light-emitting body, a power supply module and a first connector that are connected to the support base, wherein the light-emitting body is electrically connected to the power supply module;

a display assembly, comprising: a carrier, a second connector connected to the carrier and facing the support base, and a display screen connected to the carrier, wherein the display screen is electrically connected to the power supply module; and a support assembly, connected to the first connector and the second connector, wherein the support assembly is sleeved outside the lampshade, and the support assembly comprises a plurality of strip-shaped blades, wherein a first end of each of the strip-shaped blades is provided with a first slot facing the support base and connected to the first connector, and a second end of each of the strip-shaped blades is provided with a second slot facing the carrier and connected to the second connector.

2. The lighting apparatus according to claim 1, wherein the first connector has an annular first protruding structure, the second connector has an annular second protruding structure, the first slot of each of the strip-shaped blades is engaged with the first protruding structure, and the second slot of each of the strip-shaped blades is engaged with the second protruding structure.

3. A lighting apparatus, comprising:

a lamp body assembly, comprising: a support base, a lampshade mounted on the support base, and a light-emitting body, a power supply module and a first connector that are connected to the support base, wherein the light-emitting body is electrically connected to the power supply module;

a display assembly, comprising: a carrier, a second connector connected to the carrier and facing the support base, and a display screen connected to the carrier, wherein the display screen is electrically connected to the power supply module, and the carrier comprises a sub-carrier connected to an end, distal from the support base, of the lampshade, and a first carrying plate connected to the sub-carrier, wherein a surface, distal from a light-emitting surface, of the display screen is bonded to a surface, distal from the sub-carrier, of the first carrying plate; and a support assembly, connected to the first connector and the second connector.

4. The lighting apparatus according to claim 3, wherein the surface, distal form the sub-carrier, of the first carrying plate is provided with a carrying slot, and the display screen is disposed in the carrying slot.

5. The lighting apparatus according to claim 3, wherein the carrier further comprises a second carrying plate connected to the sub-carrier; and the display assembly further comprises a drive circuit board fixedly connected to a surface, distal from the sub-carrier, of the second carrying plate, the drive circuit board being electrically connected to the display screen.

6. The lighting apparatus according to claim 5, wherein the display screen comprises a display panel and a printed circuit board with a first end electrically connected to the display panel, wherein a second end of the printed circuit board is electrically connected to the drive circuit board, and the surface, distal from the light-emitting surface, of the display panel is bonded to the surface, distal from the sub-carrier, of the first carrying plate.

7. The lighting apparatus according to claim 6, wherein the display panel is a flexible display panel, the printed circuit board is a flexible printed circuit board, and the surface, distal from the sub-carrier, of the first carrying plate is an arched arc surface.

8. The lighting apparatus according to claim 7, wherein two display screens are disposed in the display assembly, and in the two display screens, ends, distal from the printed circuit board, of the two display panels are stitched to each other.

9. The lighting apparatus according to claim 7, wherein the surface, distal from the sub-carrier, of the first carrying plate is provided with a strip-shaped positioning structure, two display screens are disposed in the display assembly, and an end, distal from the flexible circuit board, of each of the two display panels is stitched to the positioning structure.

10. The lighting apparatus according to claim 3, wherein the display assembly further comprises a transparent protective housing sleeved on the carrier, wherein the display screens are disposed between the transparent protective housing and the first carrying plate.

11. The lighting apparatus according to claim 6, wherein the display screen further comprises a touch panel disposed on a side, distal from the first carrying plate, of the display panel.

12. The lighting apparatus according to claim 1, wherein the lighting apparatus further comprises a wire barrel, wherein the support base is connected to a first end of the wire barrel, the carrier and the lampshade are both sleeved on the wire barrel, and a wire for connecting the display screen to the power supply module is housed in the wire barrel.

13. The lighting apparatus according to claim 12, wherein the lighting apparatus further comprises a switch assembly disposed on a second end of the wire barrel, wherein the switch assembly is electrically connected to the power supply module.

14. The lighting apparatus according to claim 13, wherein the lighting apparatus further comprises a sealing protective cover, wherein the sealing protection cover is sleeved on the wire barrel and disposed between the switch assembly and the carrier.

15. The lighting apparatus according to claim 12, wherein the carrier comprises a sub-carrier connected to an end, distal from the support base, of the lampshade, the sub-carrier is provided with a through hole, and the carrier is sleeved on the wire barrel through the through hole.

16. The lighting apparatus according to claim 14, wherein the second end of the wire barrel is provided with a snap-fit protrusion, the sealing protective cover is provided with a snap-fit groove matching the snap-fit protrusion in shape, and the sealing protective cover is sleeved on the wire barrel by the snap-fit protrusion and the snap-fit groove.

17. The lighting apparatus according to claim 15, wherein the sealing protective cover is provided with a support protrusion matching the through hole in the sub-carrier, the support protrusion is disposed in the through hole, and an outer wall of the support protrusion is butted against an inner wall of the sub-carrier.

18. The lighting apparatus according to claim 1, wherein the lamp body assembly further comprises an anti-skid gasket connected to the side, distal from the light-emitting body, of the support base.

19. The lighting apparatus according to claim 3, wherein the lighting apparatus further comprises a wire barrel, wherein the support base is connected to a first end of the wire barrel, the carrier and the lampshade are both sleeved on the wire barrel, and a wire for connecting the display screen to the power supply module is housed in the wire barrel.

20. The lighting apparatus according to claim 3, wherein the lamp body assembly further comprises an anti-skid gasket connected to the side, distal form the light-emitting body, of the support base.

* * * * *